(12) United States Patent
Zhang et al.

(10) Patent No.: US 12,256,378 B2
(45) Date of Patent: Mar. 18, 2025

(54) METHOD AND SYSTEMS FOR MULTIPLE PRECODER INDICATION FOR PHYSICAL UPLINK SHARED CHANNEL COMMUNICATIONS

(71) Applicant: Apple Inc., Cupertino, CA (US)

(72) Inventors: Yushu Zhang, Beijing (CN); Chunhai Yao, Beijing (CN); Chunxuan Ye, San Diego, CA (US); Dawei Zhang, Saratoga, CA (US); Haitong Sun, Cupertino, CA (US); Hong He, San Jose, CA (US); Jie Cui, San Jose, CA (US); Oghenekome Oteri, San Diego, CA (US); Sigen Ye, Whitehouse Station, NJ (US); Wei Zeng, Saratoga, CA (US); Weidong Yang, San Diego, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/441,929

(22) PCT Filed: Aug. 5, 2020

(86) PCT No.: PCT/CN2020/107205
§ 371 (c)(1),
(2) Date: Sep. 22, 2021

(87) PCT Pub. No.: WO2022/027362
PCT Pub. Date: Feb. 10, 2022

(65) Prior Publication Data
US 2023/0156692 A1    May 18, 2023

(51) Int. Cl.
*H04W 72/1268* (2023.01)
*H04L 5/00* (2006.01)
*H04W 72/23* (2023.01)

(52) U.S. Cl.
CPC ....... *H04W 72/1268* (2013.01); *H04L 5/0051* (2013.01); *H04W 72/23* (2023.01)

(58) Field of Classification Search
CPC .............. H04W 72/1268; H04W 72/23; H04L 5/0051; H04L 5/0023; H04L 5/0044;
(Continued)

(56) References Cited

U.S. PATENT DOCUMENTS

| 2019/0296809 A1 | 9/2019 | Li et al. |
| 2020/0106559 A1 | 4/2020 | Vilaipornsawai et al. |

(Continued)

FOREIGN PATENT DOCUMENTS

| CN | 110036571 A | 7/2019 |
| CN | 110601733 A | 12/2019 |

(Continued)

OTHER PUBLICATIONS

International Search Report mailed Apr. 25, 2021 for Appl. No. PCT/CN2020/107205, 4 pages.

(Continued)

*Primary Examiner* — Eric Myers
(74) *Attorney, Agent, or Firm* — Sterne, Kessler, Goldstein & Fox P.L.L.C.

(57) ABSTRACT

Approaches for performing Physical Uplink Shared Channel (PUSCH) transmissions include receiving, by a user equipment (UE) from a base station, an indicator of a plurality of precoders corresponding to M Physical Uplink Shared Channel (PUSCH) repetitions, wherein M is an integer. A plurality of precoders corresponding to two or more of the M PUSCH repetitions are indicated. The UE configures the plurality of precoders based on the indicator and transmits one or more of the M Physical Uplink Shared Channel (PUSCH) repetitions corresponding to one or more of the plurality of precoders. The indicator can be provided in (Continued)

higher layer signaling. One or more transmission rank indicator (TRIs) and transmission precoder matrix indicators (TPMIs) for the M PUSCH repetitions can be provided. The indicator can be provided in a scheduling downlink control indicator (DCI) communication. The indicator can also be provided within N sounding reference signal (SRS) resource indicator(s) (SRIs) of the scheduling DCI.

20 Claims, 10 Drawing Sheets

(58) Field of Classification Search
CPC ....... H04L 5/0094; H04L 1/08; H04B 7/0639; Y02D 30/70
See application file for complete search history.

(56) References Cited

U.S. PATENT DOCUMENTS

| | | | |
|---|---|---|---|
| 2021/0099214 A1 | 4/2021 | Ren et al. | |
| 2022/0417965 A1* | 12/2022 | Wang | H04B 7/0456 |
| 2023/0344504 A1* | 10/2023 | Cha | H04L 5/0094 |

FOREIGN PATENT DOCUMENTS

| | | | |
|---|---|---|---|
| WO | WO2019/057094 A1 | 3/2019 | |
| WO | WO 2019/096921 A1 | 5/2019 | |
| WO | WO 2020/232145 A1 | 11/2020 | |

OTHER PUBLICATIONS

Written Opinion mailed Apr. 25, 2021 for Appl. No. PCT/CN2020/107205, 4 pages.
NTT Docomo, Inc., 3GPP TSG RAN WG1 #97 R1-1906225, Discussion on multi-beam enhancement, May 17, 2019 (May 17, 2019) the whole document; 24 pages.
NTT Docomo, Inc., 3GPP TSG RAN WG1 Meeting #94 R1-1809165, Enhanced UL transmission with configured grant for URLLC, Aug. 24, 2018 (Aug. 24, 2018) the whole document; 5 pages.
3GPP TS 38.212 V15.9.0, 3rd Generation Partnership Project; Technical Specification Group Radio Access Network; NR; Multiplexing and channel coding (Release 15), Jun. 2020; 101 pages.
3GPP TS 38.214 V15.10.0, 3rd Generation Partnership Project; Technical Specification Group Radio Access Network; NR; Physical layer procedures for data (Release 15), Jun. 2020; 106 pages.
3GPP TS 38.321 V15.9.0, 3rd Generation Partnership Project; Technical Specification Group Radio Access Network; NR; Medium Access Control (MAC) protocol specification (Release 15), Jul. 2020; 78 pages.
3GPP TS 38.331 V15.10.0, 3rd Generation Partnership Project; Technical Specification Group Radio Access Network; NR; Radio Resource Control (RRC) protocol specification (Release 15), Jul. 2020; 539 pages.

* cited by examiner

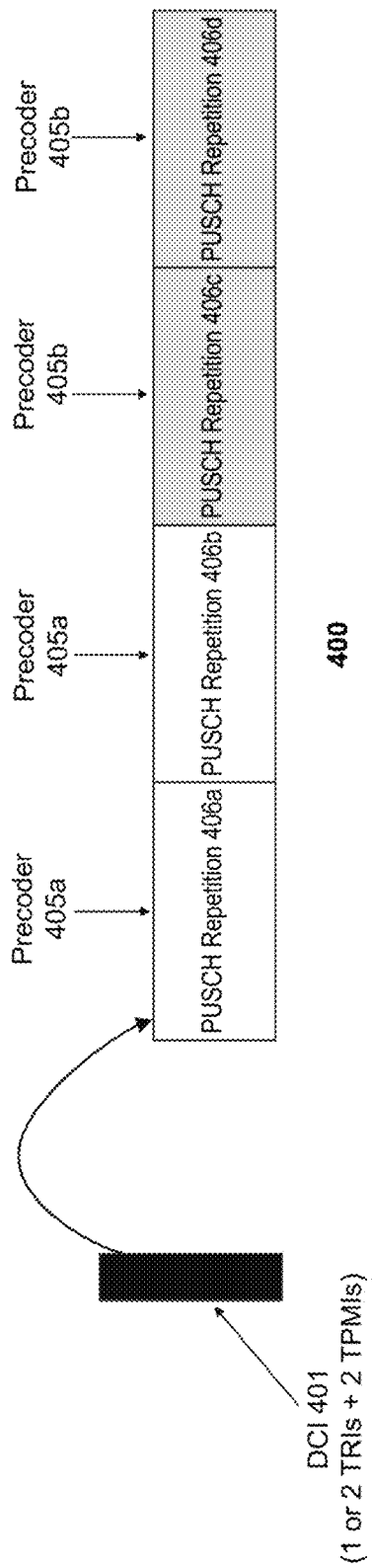
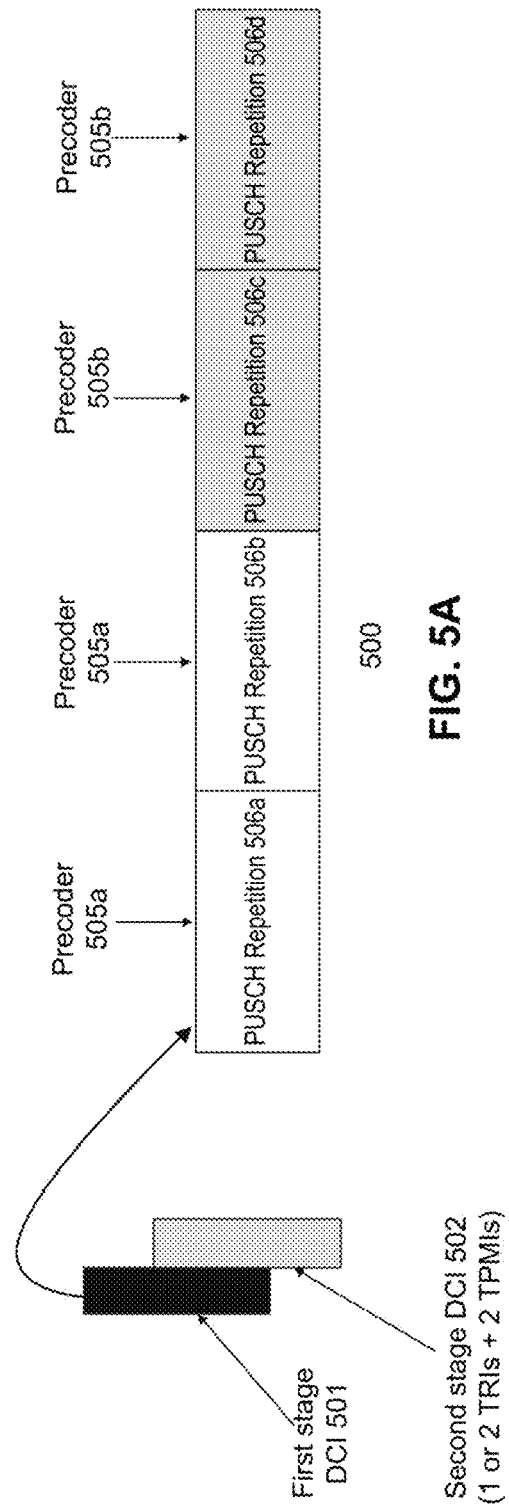
FIG. 4
FIG. 5A

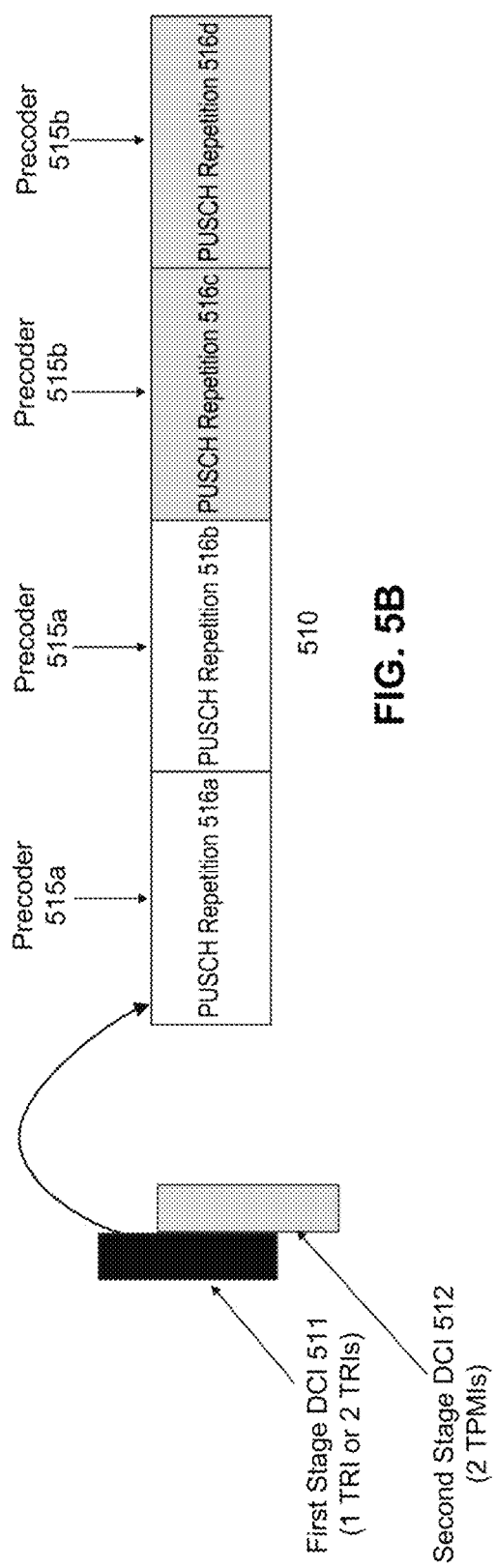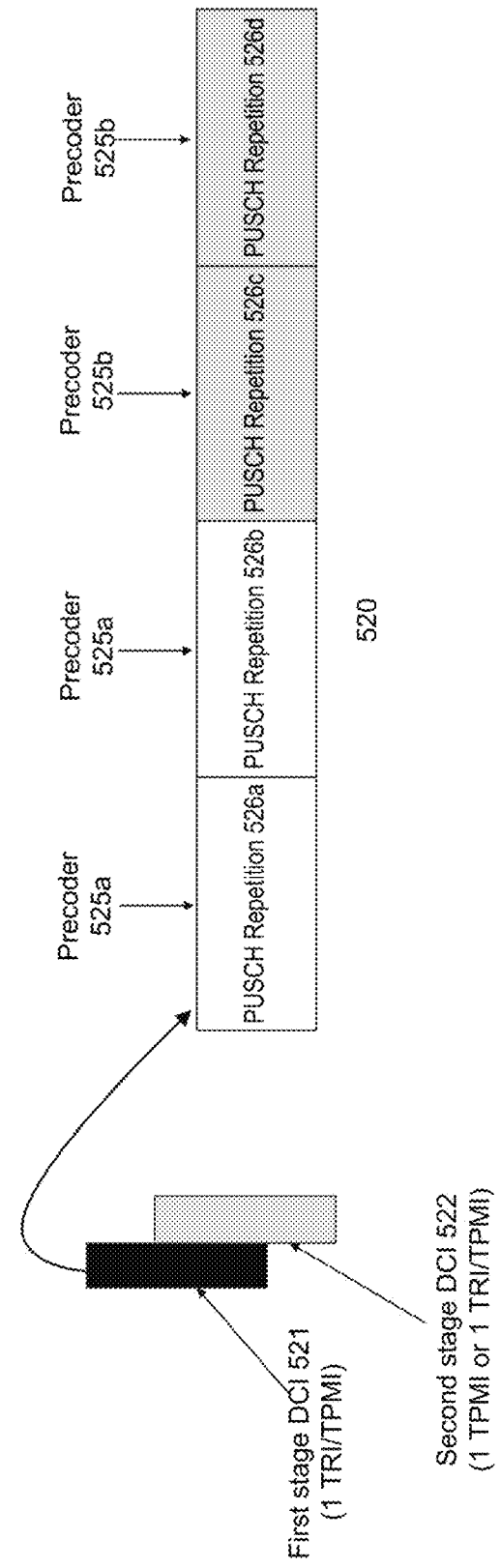

METHOD AND SYSTEMS FOR MULTIPLE PRECODER INDICATION FOR PHYSICAL UPLINK SHARED CHANNEL COMMUNICATIONS

CROSS REFERENCE TO RELATED APPLICATIONS

This application is a National Stage application under 35 U.S.C. § 371 of International Application No. PCT/CN2020/107205, having an International Filing Date of Aug. 5, 2020.

BACKGROUND

Field

The described aspects generally relate to cell detection and measurement in wireless communications. For example, the aspects of this disclosure relate to mechanisms for indicating and enabling precoders for Physical Uplink Shared Channel Communications (PUSCH) between an electronic device (for example, a user equipment (UE)) and a network.

Background

While a user equipment (UE) is connected to a base station (for example, an evolved Node B (eNB) or next generation node B (gNB)) in one cell to communicate through the wireless network associated to that base station, the UE can transmit one or more PUSCH repetitions, which can involve increased resource and power consumption.

SUMMARY

Some aspects of this disclosure include apparatuses and methods for coordinating PUSCH communications between a user equipment (UE) and a base station. In some aspects, a UE receives information about how many layers are to be transmitted. In some aspects, a UE can transmit a one or more layer PUSCH communication and use one or more transmission chains. In some aspects, the signals will be communicated between the LIE and base station in beams. For example, the UE may receive signals from one direction at a time. In some aspects, a codebook-based precoding scheme or a non-codebook based preceding scheme can be implemented for PUSCH communication between a UE and base station to coordinate beamforming and signaling.

According to some aspects of a codebook-based scheme, a UE can transmit one or two sounding reference set (SRS) resources, where each SRS resource can have one or more ports (for example, 1, 2 or 4 ports). According to some aspects, the base station (e.g., a gNB) can communicate one or more of a SRS resource indicator (SRI), and Transmitted Precoding Matrix indicator (TPMI) that includes information about an index of a precoding matrix selected for transmission of the PUSCH as the precoding information, which can be jointly encoded with a Transmitted Rank Indicator (TRI) about the layer used for the PUSCH transmission. The UE then performs the PUSCH transmission.

According to some aspects of a non-codebook-based scheme, a base station can communicate a CSI-RS to a UE for assisting calculating an uplink (UL) precoder (using DL-UL reciprocity. The UE can transmit one or more (for example, one to four, or one to eight) SRS resources. According to some embodiments, each SRS resource includes one port and corresponds to a PUSCH layer. The base station can communicate more than one SRS resource indicators (SRIs). The UE then performs PUSCH transmission. According to some embodiments, the number of SRIs can determine a rank.

According to some aspects, the UE determines or selects precoders based on signaling from the base station. A UE can transmit one or more (for example, two) sounding reference set (SRS) resources, where each SRS resource can have one or more ports (for example, 1, 2 or 4 ports). According to some aspects, the base station (e.g., a gNB) can communicate one or more of a radio resource control signal, SRS resource indicator (SRI), TPMI and TRI (UE precoder matrix from a precoder codebook and rank), to indicate precoders. The UE then performs the PUSCH transmission.

For example, a UE may transmit up to four layers of a PUSCH communication. In some aspects, the UE evaluates several possible precoders, e.g., beams. In some embodiments, the precoders are selected based on a common codebook. The base station may indicate one or more precoders to a UE, which consequently implements the one or more precoders in communicating PUSCH transmissions. In some embodiments, uplink channel state information (UL-CSI) can be obtained based on an uplink sounding resource set (UL-SRS) transmission.

According to some embodiments, a UE receives, from a base station, an indicator of a plurality of precoders corresponding to M Physical Uplink Shared Channel (PUSCH) repetitions, wherein M is an integer. A plurality of precoders corresponding to each of the M PUSCH repetitions is indicated. The UE configures the plurality of precoders based on the indicator and transmits one or more of the M Physical Uplink Shared Channel (PUSCH) repetitions corresponding to one or more of the plurality of precoders. The indicator can be provided in higher layer signaling. One or more transmission rank indicator (TRIs) and transmission precoder matrix indicators (TPMIs) for the M PUSCH repetitions can be provided. The indicator can be provided in a scheduling downlink control indicator (DCI) communication. The indicator can also be provided within N sounding reference signal (SRS) resource indicator(s) (SRIs) of the scheduling DCI.

This Summary is provided merely for purposes of illustrating some aspects to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

FIG. 4 depicts multiple precoders in a repetitive PUSCH transmission scheme configured by single stage signaling and contributing to improved uplink transmissions, according to some aspects of the disclosure.

FIGS. 5A to 5C depicts multiple precoders in a repetitive PUSCH transmission scheme, configured by first and second stage signaling and contributing to improved uplink transmissions, according to some aspects of the disclosure.

Figure 1:
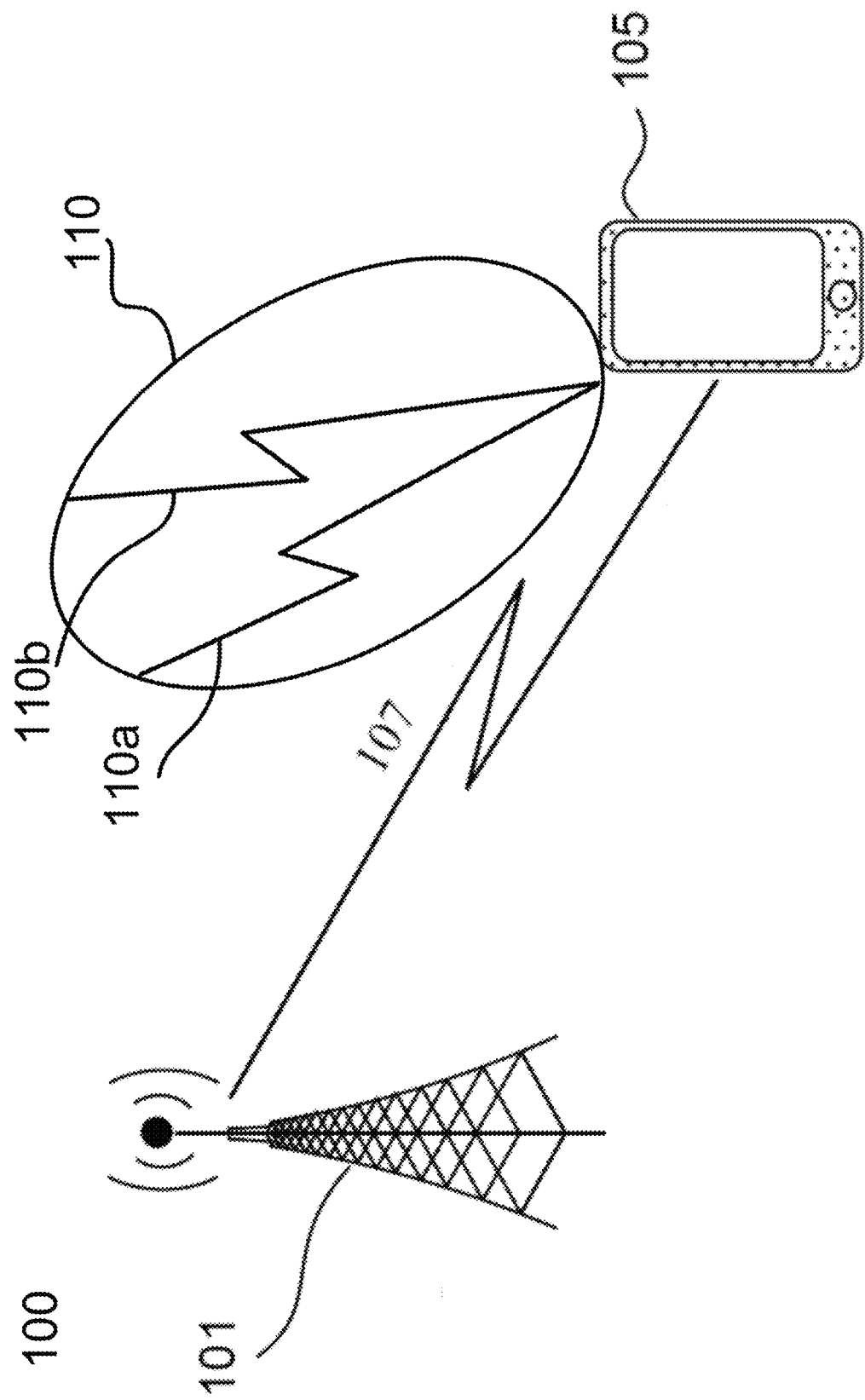
FIG. 1 illustrates an example system 100 implementing multiple precoders in a repetitive PUSCH transmission, between an electronic device and a network, according to some aspects of the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Some aspects of this disclosure include apparatuses and methods for implementing mechanisms for enabling repetitions of one or more PUSCH transmissions between an electronic device and a network.

A UE operating in a wireless network can be configured to use multiple precoders according to the data traffic for the UE. An increase in reduction in the UE bandwidth may reduce the UE power consumption. The physical downlink control channel (PDCCH) controls, for example DL scheduling assignments (e.g., physical downlink shared channel, PDSCH). UL scheduling grants (e.g., PUSCH), and special purposes such as slot format indication, preemption indication, and power control. The DCI contains the scheduling information for the UL or DL data channels and other control information for one UE or a group of UEs. Operating in NR-U. DCI formats can include additional fields to transmit control information One or more transmission schemes are supported for PUSCH transmission. For example, a base station can configure a UE to enable a codebook-based transmission scheme and, or, a non-codebook based transmission scheme.

For example, a gNB can send a signal enabling a first transmission scheme that involves codebook based transmission. A base station, such as a gNB, can indicate a transmission precoder matrix indicator (TPMI) and transmission rank indicator (TRI) for enabling the UE to implement a precoder. The TPMI and TRI can be indicated, e.g., jointly indicated, by a downlink control information (DCI) field, such as the "Precoding information and number of layers" field of a DCI communication.

Subsequently, the UE applies the precoder indicated by the TPMI and TRI based on a pre-defined codebook, i.e., a common codebook that is pre-defined, or otherwise pre-configured by a base station, for PUSCH transmission.

For example, a gNB can send a signal enabling a second transmission scheme by which a non-codebook based transmission is implemented. A base station (e.g., gNB), can indicate one or multiple SRS resource indicators (SRIs) by the DCI. One or more different single-layer precoders can be applied to different SRS resources. The UE then selects the precoders based on the indicated SRSs to transmit the PUSCH communication. In some aspects, the transmission scheme (e.g., codebook or non-codebook) can also be configured by RRC signaling.

In some embodiments, the UE can perform the PUSCH transmission repeatedly using multiple precoders (e.g., beams). That is, the UE can transmit a single PUSCH communication multiple times using more than one beam, in a form using precoding.

Enabling Multiple Precoders by RRC Signaling

In addition to identifying whether a codebook or non-codebook scheme is to be implemented, a base station can also transmit to a UE an indication of whether multiple precoders are to be enabled.

According to some aspects, a base station can transmit, by higher layer signaling, first parameter indicating whether one or multiple precoders are enabled for PUSCH transmission. For example, a gNB can transmit a value indicating that multiple precoders are enabled. The gNB can transmit, by RRC signaling, a value indicating the quantity of precoders that are to be enabled. The gNB can alternatively or additionally indicate the transmission scheme.

For example, the RRC can include one or more parameter for PUSCH transmission, such as multiPrecoderBasedCodebook, and multiPrecoderBasedNonCodebook, to respectively indicate whether multiple precoders are enabled for a codebook-based, or non-codebook based, PUSCH transmission scheme. Additionally or alternatively, a gNB can configures a repetition-based PUSCH transmission scheme, and further indicate multiple precoders for each repetition.

FIG. 1 illustrates an example system 100 implementing mechanisms for configuring PUSCH transmission an electronic device and a network, according to some aspects of the disclosure. Example system 100 is provided for the purpose of illustration only and does not limit the disclosed aspects. System 100 may include, but is not limited to, network nodes (for example, base stations such as gNB) 101 and electronic device (for example, a UE) 105. Electronic device 105 (hereinafter referred to as UE 105) can include an electronic device configured to operate based on a wide variety of wireless communication techniques. These techniques can include, but are not limited to, techniques based on 3rd Generation Partnership Project (3GPP) standards. For example, UE 105 can include an electronic device configured to operate using Release 17 (Rel-17) or later. UE 105 can include, but is not limited to, as wireless communication devices, smart phones, laptops, desktops, tablets, personal assistants, monitors, televisions, wearable devices, Internet of Things (IoTs), vehicle's communication devices, and the like. Network node 101 (herein referred to as base station) can include nodes configured to operate based on a wide variety of wireless communication techniques such as, but not limited to, techniques based on 3GPP standards. For example, base station 101 can include nodes configured to operate using Release 17 (Rel-17) or later.

According to some aspects, UE 105 and base station 101 are configured to implement mechanisms for configuring PUSCH transmission between UE 101 and a network associated with base station 101. For example, UE 105 can be connected to and can be communicating with base station 101 using carrier 107. According to some aspects, carrier 107 can include one carrier. Additionally. or alternatively, carrier 107 can include two or more component carriers (CC). In other words, UE 105 can implement carrier aggregation (CA). For example, UE can use multiple carriers for communication with base station 101. In some examples, the UE can use a primary component carrier (PCC) with one or more secondary component carriers (SCC). The carriers can be used using Frequency Division Duplex (FDD), Time Division Duplex, or a mix of TDD and FDD. In some examples, the PCC can be used for control signaling and SCC(s) can be used for data. However, the aspects of this disclosure are not limited to these examples.

According to some aspects, UE 105 is configured to coordinate PUSCH transmission scheme 110 with base station 101 and/or the network associated with base station 101. For example, before or during a process of communicating with base station 101, UE 105 can enable multiple repetitions (e.g., first transmission 110a and second transmission 110b) of PUSCH transmission scheme 110. For example, and as described above, base station 101 can define and transmit via carrier 107 a parameter such as multi-PrecoderBasedCodebook, and multiPrecoderBasedNon-Codebook to represent a PUSCH transmission scheme to be configured by UE 105. In some aspects, UE 105 can define multiPrecoderBasedCodebook, and multiPrecoderBased-NonCodebook based on a DC transmission of carrier 107. In some examples, the value of paging_inactivityTimer may be configured by a system information block or dedicated RRC message of carrier 107 for a given UE. In some aspects, UE 105 may enable multiple precoders for repetitions of one or more PUSCH transmission schemes if the UE detects one or more of the multiPrecoderBasedCodebook, and multi-PrecoderBasedNonCodebook parameters.

Figure 2:
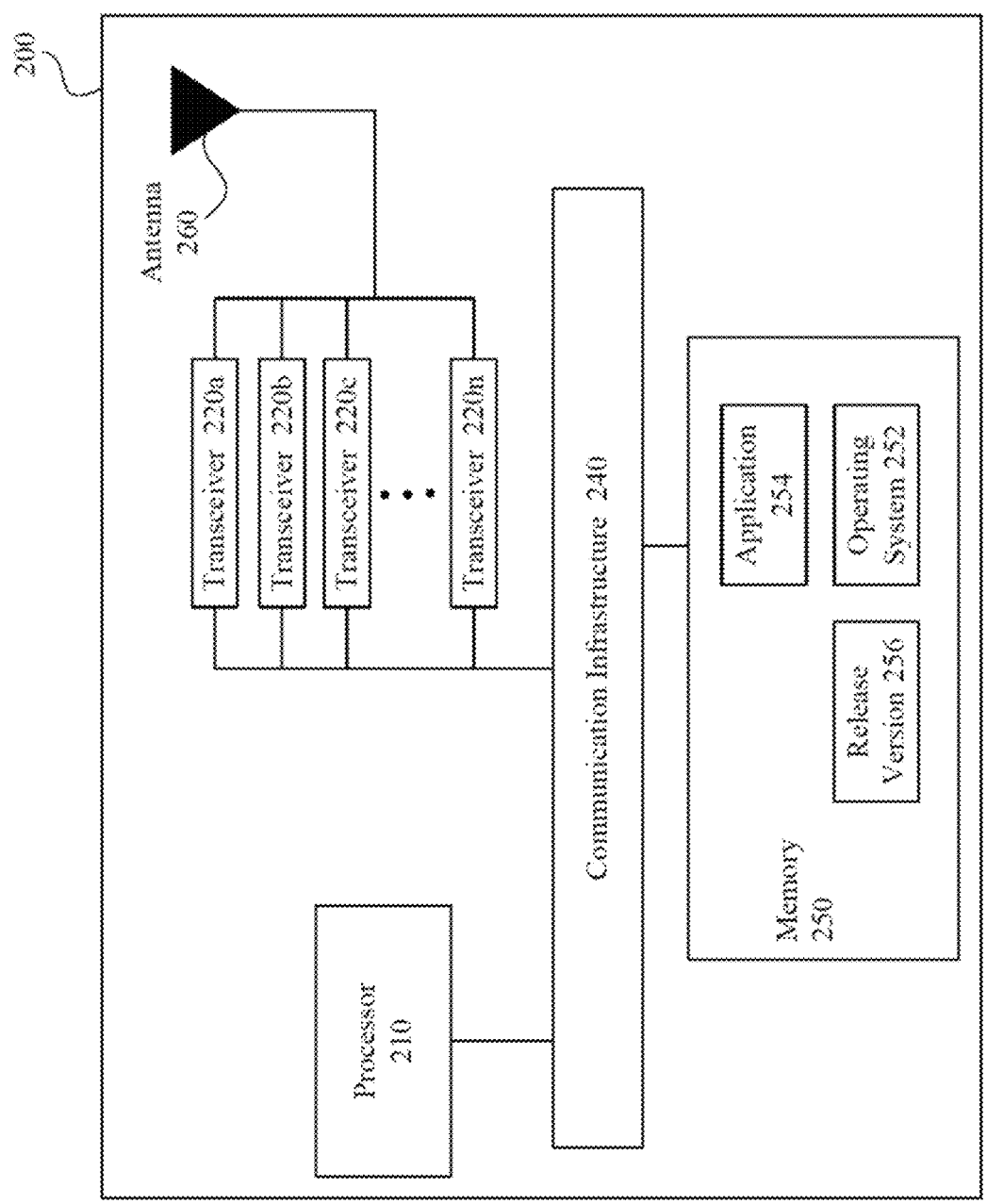
FIG. 2 illustrates a block diagram of an example system of an electronic device implementing multiple precoders in a repetitive PUSCH transmission, according to some aspects of the disclosure.

FIG. 2 illustrates a block diagram of an example system 200 of an electronic device implementing mechanisms for configuring PUSCH transmission, including configuring repetitive PUSCH transmission, according to some aspects of the disclosure. System 200 may be any of the electronic devices (e.g., one or more base stations 101, UE 105) of system 100. System 200 includes processor 210, one or more transceivers 220a-220n, communication infrastructure 240, memory 250, operating system 252, application 254, and antenna 260. Illustrated systems are provided as exemplary parts of system 200, and system 200 can include other circuit(s) and subsystem(s). Also, although the systems of system 200 are illustrated as separate components, the aspects of this disclosure can include any combination of these, less, or more components.

Memory 250 may include random access memory (RAM) and/or cache, and may include control logic (e.g., computer software) and/or data. Memory 250 may include other storage devices or memory such as, but not limited to, a hard disk drive and/or a removable storage device/unit. According to some examples, operating system 252 can be stored in memory 250. Operating system 252 can manage transfer of data front memory 250 and/or one or more applications 254 to processor 210 and/or one or more transceivers 220a-220n. In some examples, operating system 252 maintains one or more network protocol stacks (e.g., Internet protocol stack, cellular protocol stack, and the like) that can include a number of logical layers. At corresponding layers of the protocol stack, operating system 252 includes control mechanism and data structures to perform the functions associated with that layer.

According to some examples, application 254 can be stored in memory 250. Application 254 can include applications (e.g., user applications) used by wireless system 200 and/or a user of wireless system 200. The applications in application 254 can include applications such as, but not limited to, Siri™, FaceTime™, radio streaming, video streaming, remote control, and/or other user applications.

System 200 can also include communication infrastructure 240. Communication infrastructure 240 provides communication between, for example, processor 210, one or more transceivers 220a-220n, and memory 250. In some implementations, communication infrastructure 240 may be a bus. Processor 210 together with instructions stored in memory 250 performs operations enabling system 200 of system 100 to implement mechanisms for configuring precoders corresponding to one or more repetitions of PUSCH transmission(s), as described herein. Additionally, or alternatively, one or more transceivers 220a-220n perform operations enabling system 200 of system 100 to implement mechanisms for configuring and enabling precoders corresponding to one or more repetitions of PUSCH transmission(s), as described herein.

One or more transceivers 220a-220n transmit and receive communications signals that support mechanisms for repetitive PUSCH communications, including implementing precoders corresponding to one or more repetitions of PUSCH transmission(s), according to some aspects, and may be coupled to one or more antennas or antenna panels 260. Antennas or antenna panels 260 may include one or more antennas that may be the same or different types. One or more transceivers 220a-220n allow system 200 to communicate with other devices that may be wired and/or wireless. In some examples, one or more transceivers 220a-220n can include processors, controllers, radios, sockets, plugs, buffers, and like circuits/devices used for connecting to and communication on networks. According to some examples, one or more transceivers 220a-220n include one or more circuits to connect to and communicate on wired and/or wireless networks.

According to some aspects of this disclosure, one or more transceivers 220a-220n can include a cellular subsystem, a WLAN subsystem, and/or a Bluetooth™ subsystem, each including its own radio transceiver and protocol(s) as will be understood by those skilled arts based on the discussion provided herein. In some implementations, one or more transceivers 220a-220n can include more or fewer systems for communicating with other devices.

In some examples, one or more transceivers 220a-220n can include one or more circuits (including a WLAN transceiver) to enable connection(s) and communication over WLAN networks such as, but not limited to, networks based on standards described in IEEE 802.11.

Additionally, or alternatively, one or more transceivers 220a-220n can include one or more circuits (including a Bluetooth™ transceiver) to enable connection(s) and communication based on, for example, Bluetooth™ protocol, the Bluetooth™ Low Energy protocol, or the Bluetooth™ Low Energy Long Range protocol. For example, transceiver 220n can include a Bluetooth™ transceiver.

Additionally, one or more transceivers 220a-220n can include one or more circuits (including a cellular transceiver) for connecting to and communicating on cellular networks. The cellular networks can include, but are not limited to, 3G/4G/5G networks such as Universal Mobile Telecommunications System (UMTS), Long-Term Evolution (LTE), and the like. For example, one or more transceivers 220a-220n can be configured to operate according to one or more of Rel-15, Rel-16, Rel-17, or later of 3GPP standard.

According to some aspects of this disclosure, processor 210, alone or in combination with computer instructions stored within memory 250, and/or one or more transceiver 220a-220n, implements one or more PUSCH transmission schemes discussed herein. For example, transceiver 220a can enable connection(s) and communication over a first carrier (for example, carrier 107 of FIG. 1) and transmission of one or more repetitions 110a and 110b of a PUSCH transmission scheme. Additionally, or alternatively, wireless system 200 can include one transceiver configured to operate at different carriers. Processor 210 can be configured to control the one transceiver to switch between different carriers, according to some examples.

According to some aspects of this disclosure, processor 210, alone or in combination with computer instructions stored within memory 250, and/or one or more transceiver 220a-220n, implements mechanisms for coordinating one or more PUSCH transmission schemes, including a repetitive PUSCH transmission scheme implemented with one or more precoders, as described herein. Although the operations discussed herein are discussed with respect to processor 210, it is noted that processor 210, alone or in combination with computer instructions stored within memory 250, and/or one or more transceiver 220a-220n, can implement these operations. For example, processor 210 is configured to coordinate one or more PUSCH transmission schemes of system 200 from a base station (and/or a network associated with the base station) as a per-LIE capability, during an initial communication discussed above (or any other initial access). Processor 210 can use RRC layer signaling, a MAC layer, and/or a PHY layer signaling to configure and implementing precoders corresponding to one or more repetitions of PUSCH transmission(s).

In some examples, processor 210 can be configured to coordinate one or more PUSCH transmission schemes of system 200 from a base station (and/or the network associated with base station) using system 200's release version. For example, release version 256 stored in, for example, memory 250 can be indicative of whether system 200 is configured to operate at one or more of Rel-16, Rel-15, or earlier and/or Rel-17 or later. Processor 210 can generate and transmit a signal including/indicating release version 256. In these examples, base station (and/or the network associated with base station) can configure multiple precoders for a PUSCH transmission scheme associated with system 200 based on the release version 256.

PUSCH Repetition Based on Two Stage DCIs

Figures 3A, 3B:
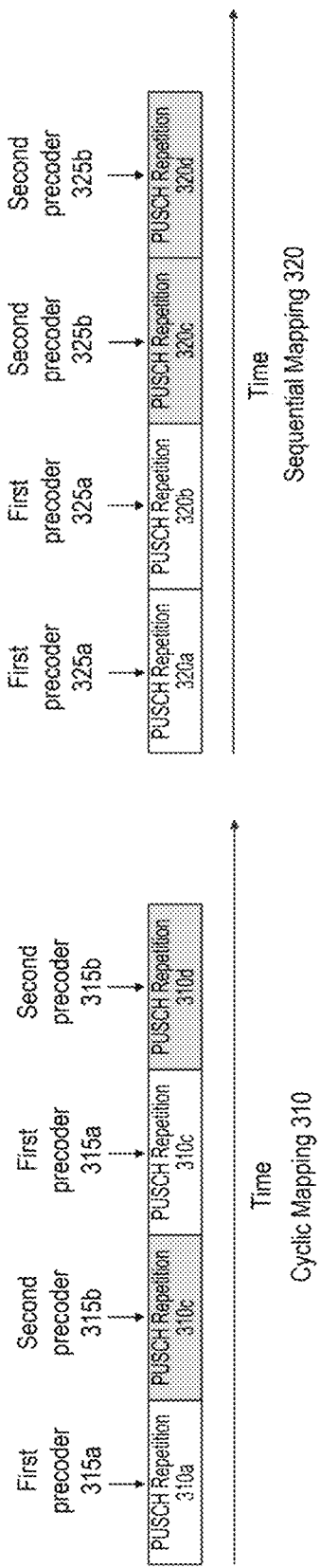
FIGS. 3A and 3B depict multiple precoders in a repetitive PUSCH transmission scheme to improve contributing to improved uplink transmissions.

FIGS. 3A and 3B illustrate, respectively, a cyclic mapping scheme and a sequential mapping scheme, for multiple PUSCH repetitions.

As shown in FIG. 3A, a cyclic mapping scheme 310 alternates precoders for each repetition of the PUSCH transmission. That is, each of first precoder 315a and second precoder 315b is alternated for respective repetitions (e.g., first PUSCH repetition 310a, second PUSCH repetition 310b, third PUSCH repetition 310c, and fourth PUSCH repetition 310d) of the PUSCH transmission.

That is, UE 105 can be configured to coordinate PUSCH transmission scheme 310 with base station 101 and/or the network associated with base station 101. For example, before or during a process of communicating with base station 101, UE 105 can coordinate a precoder mapping with respect to the multiple repetitions, first PUSCH repetition 310a, second PUSCH repetition 310b, third PUSCH repetition 310c, and fourth PUSCH repetition 310d, of PUSCH transmission scheme 110.

As shown in FIG. 3B, a sequential mapping scheme 320 implements each precoder corresponding to sequential repetitions of the PUSCH transmission, and alternates precoders following performing a repetition sequence. That is, precoder 325a is mapped to a sequence of first PUSCH repetition 320a and second PUSCH repetition 320b of the PUSCH transmission. The scheme then alternates the precoder, mapping precoder 325b to correspond to third PUSCH repetition 320c, and fourth PUSCH repetition 320d of the PUSCH transmission.

That is. FIGS. 3A and 3B depict, by non-limiting examples, two precoders (e.g., 315a and 315b, or 325a and 325b) and four PUSCH repetitions (e.g., 310a to 31db or 320a to 320d). However, any number of PUSCH repetitions can be implemented in a cyclic mapping PUSCH transmission scheme 310 or in a sequential mapping PUSCH transmission scheme 320. For example, two, four, eight, or more precoders, and two, four, eight, sixteen, or more PUSCH repetitions, can be implemented by UE 105 (and configured by base station 101).

PUSCH Repetition Precoder Mapping Schemes Configured by DC

As described above, processor 210 can implement different mechanisms for configuring multiple codebook-based PUSCH transmission repetitions in system 100 of FIG. 1. FIGS. 4 and 5A to 5C illustrate an example of a system (for example a user equipment (UE)) configuration of precoded PUSCH transmission repetitions, according to some aspects of the disclosure utilizing DCI. A mapping scheme (for example, a sequential mapping scheme) can be implemented according to one or more stages of DCI configuration. The DCI can include information about one or more TRIs and one or more TPMIs based on a precoder codebook. As a convenience and not a limitation, FIGS. 4 and 5A to 5C may be described with regard to elements of FIGS. 1, and 2, and 10. While a sequential mapping scheme is illustrated in FIGS. 4 to 5C, the scheme is shown for illustration purposes only and is in no way limiting. A person of ordinary skill in the art would recognize that a cyclic mapping scheme, such as one performed in FIG. 3A can be implemented.

As shown in FIG. 4, a mapping 400 of precoders and PUSCH repetitions can be configured according to a single (one) DCI 401. For example, DCI 401 can include information about a precoder matrix, implemented according to one or more (e.g., one or two) TRIs and one or more (e.g., two) TPMIs. UE 105 is configured based on the one or two TRIs and two TPMIs to perform a sequential mapping of a first precoder 405a and second precoder 405b in sequence with corresponding repetitions (e.g., first PUSCH repetition 406a, second PUSCH repetition 406b, third PUSCH repetition 406c, and fourth PUSCH repetition 406d) of the PUSCH transmission. For example, based on two TRIs and two TPMIs, UE 105 is configured to sequentially associate first precoder 405a to first PUSCH repetition 320a and second PUSCH repetition 406b of the PUSCH transmission. The scheme alternates, and second precoder 405b is mapped to correspond to third PUSCH repetition 406c, and fourth PUSCH repetition 406d of the PUSCH transmission.

FIGS. 5A to 5C illustrate a mapping scheme of precoders and PUSCH repetitions that can be implemented based on two DCIs, e.g., a first stage and a second stage DCI. As shown in FIG. 5A, a mapping 500 of precoders and PUSCH repetitions can be configured according to a first stage DCI 501 and a second stage DCI 502. For example, second stage DCI 502 can include information about a precoder matrix, implemented according to one or more (e.g., one or two) TRIs and one or more (e.g., two) TPMIs. UE 105 is configured based on the one or two TRIs and two TPMIs to perform a sequential mapping of a first precoder 505a and second precoder 505b in sequence with corresponding repetitions (e.g., first PUSCH repetition 506a, second PUSCH repetition 506b, third PUSCH repetition 506c, and fourth PUSCH repetition 506d) of the PUSCH transmission. For example, based on two TRIs and two TPMIs, UE 105 is configured to sequentially associate first precoder 505a to first PUSCH repetition 320a and second PUSCH repetition 506b of the PUSCH transmission. The scheme alternates, and second precoder 505b is mapped to correspond to third PUSCH repetition 506c, and fourth PUSCH repetition 506d of the PUSCH transmission.

As shown in FIG. 5B, a mapping 510 of precoders and PUSCH repetitions can be configured according to a first stage DC 511 and a second stage DCI 512. For example, first stage DCI 511 can include information about a precoder matrix, implemented according to one or more (e.g., one or two) TRIs. Second stage DCI 512 can include information about one or more (e.g., two) two TPMIs. UE 105 is configured based on the one or two TRIs and two TPMIs to perform a sequential mapping of a first precoder 515a and second precoder 515b in sequence with corresponding repetitions (e.g., first PUSCH repetition 516a, second PUSCH repetition 516b, third PUSCH repetition 516c, and fourth PUSCH repetition 516d) of the PUSCH transmission. For example, based on two TRIs and two TPMIs, UE 105 is configured to sequentially associate first precoder 515a to first PUSCH repetition 320a and second PUSCH repetition 516b of the PUSCH transmission. The scheme alternates, and second precoder 515b is mapped to correspond to third PUSCH repetition 516c, and fourth PUSCH repetition 516d of the PUSCH transmission.

As shown in FIG. 5C, a mapping 520 of precoders and PUSCH repetitions can be configured according to a first stage DCI 521 and a second stage DCI 522. For example, first stage DCI 521 can include information about one TRI and one TPMI. Second stage DCI 522 can include information about two TPMIs or one TRI and one TPMI. UE 105 is configured based on the one or two TRIs and two TPMIs to perform a sequential mapping of a first precoder 525a and second precoder 525b in sequence with corresponding repetitions (e.g., first PUSCH repetition 526a, second PUSCH repetition 526b, third PUSCH repetition 526c, and fourth PUSCH repetition 526d) of the PUSCH transmission. For example, based on two TRIs and two TPMIs. UE 105 is configured to sequentially associate first precoder 525a to first PUSCH repetition 320a and second PUSCH repetition 526b of the PUSCH transmission. The scheme alternates, and second precoder 525b is mapped to correspond to third PUSCH repetition 526c, and fourth PUSCH repetition 526d of the PUSCH transmission.

Codebook Based Signaling

For codebook based PUSCH transmission, a plurality of (N) indicated precoders and (M) PUSCH repetitions can be mapped based on a predefined pattern or configured pattern.

Figure 6:
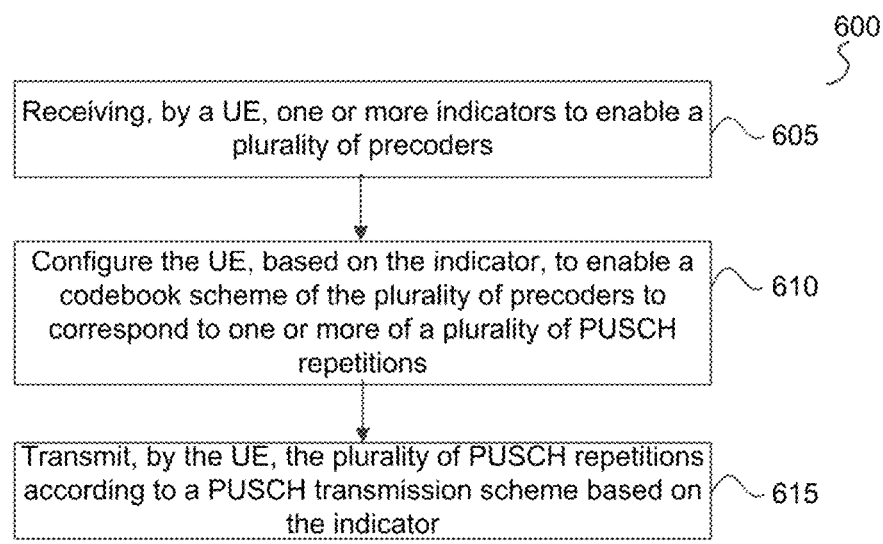
FIG. 6 illustrates an example method for a system (for example a user equipment (UE)) supporting configuration of a codebook-based repetitive PUSCH transmission scheme, according to some aspects of the disclosure.

As discussed in more detail below with respect to FIGS. 6 and 7, processor 210 can implement different mechanisms for configuring multiple codebook-based PUSCH transmission repetitions in system 100 of FIG. 1. FIG. 6 illustrates an example method 600 for a system (for example a user equipment (UE)) configuration of precoded PUSCH transmission repetitions, according to some aspects of the disclosure. As a convenience and not a limitation, FIGS. 6 and 7 may be described with regard to elements of FIGS. 1, and 2, and 10. As shown in FIG. 6, method 600 may represent the operation of an electronic device (for example, UE 105 of FIG. 1) implementing mechanisms for configuring multiple repetition PUSCH transmissions. Method 600 may also be performed by system 200 of FIG. 2 and/or computer system 1000 of FIG. 10. But method 600 is not limited to the specific aspects depicted in those figures and other systems may be used to perform the method as will be understood by those skilled in the art. It is to be appreciated that not all operations may be needed, and the operations may not be performed in the same order as shown in FIG. 6.

At 605, a UE can receive from a base station, one or more indicators to enable a plurality of precoders corresponding to a plurality of PUSCH repetitions. For example, the LIE can receive the configuration from a base station by a communications network. UE 105 is thereby enabled to transmit multiple repetition PUSCH beams. Configuring precoders to correspond to PUSCH repetitions enables PUSCH transmissions to be timely and reliably delivery in network communications but can increase resource and power demands on UE, for example. According to some aspects, configuring PUSCH transmissions permits a codebook based scheme to be implemented to coordinate operations and reduce undue resource demand.

In one example, at 605 a UE can receive from a base station, such as a gNB, an RRC that includes one or more parameter for PUSCH transmission. As described above, the UE can receive a multiPrecoderBasedCodebook parameter to indicate multiple precoders are enabled for a codebook-based PUSCH transmission scheme. Additionally or alternatively, the UE can receive from the base station a further indication of multiple precoders for each repetition. That is, at 605, the UE can receive one or more indicators to enable multi-precoder PUSCH transmission and can receive one or more indicators specifying a plurality of precoders, for example, a quantity of precoders.

At 610, the UE is configured, based on the indicator, to enable the plurality of precoders to correspond to one or more of the plurality of PUSCH repetitions. For example, the UE can be configured to map the precoders to the PUSCH repetitions by a cyclic or sequential mapping, as discussed above with respect to FIGS. 3 to 5.

In one example, UE 105 is configured to map first and second precoders 315a and 315b in alternating manner to respective repetitions (e.g., first PUSCH repetition 310a, second PUSCH repetition 310b, third PUSCH repetition 310c, and fourth PUSCH repetition 310d) of the PUSCH transmission. According to another example, the UE 105 performs a sequential mapping scheme (e.g., sequential mapping scheme 320) to sequentially associate precoders for each repetition of the PUSCH transmission. The UE 105 performs sequentially maps precoder 325a to first PUSCH repetition 320a and second PUSCH repetition 320b of the PUSCH transmission. The UE 105 sequentially maps precoder 325b to correspond to third PUSCH repetition 320c, and fourth PUSCH repetition 320d of the PUSCH transmission. Or, for example, where the same number of precoders and repetitions are provided, UE 105 can be configured to perform a one to one mapping of precoders to PUSCH repetitions. This description is in not intended to be limiting, and a cyclic mapping scheme (e.g., cyclic mapping scheme 310) can be implemented according to the above description.

At 615, the UE can use the configuration set forth above with respect to operation 610, including the PUSCH transmission scheme, to configure one or more PUSCH transmission repetitions. For example, in a UE of system 200, processor 210 can execute instructions to cause communication infrastructure 240 to transmit, via one or more transceivers 220a to 220n, a repetitive PUSCH transmission based on the configured transmission scheme. According to some aspects, processor 210 can implement processes for configuring PUSCH transmission that includes reliance on a timer, counter, or other means for enumerating PUSCH repetitions.

Codebook Signaling by TPI/TPMI

For codebook based PUSCH transmission, a plurality of (N) indicated precoders and (M) PUSCH repetitions can be mapped based on a predefined pattern or configured pattern. According to some embodiments, a base station (e.g., a gNB) can indicate one or more TRIs and one or more TPMIs corresponding to two or more PUSCH repetitions. For example, a gNB can transmit downlink control information (DCI) to indicate N TRIs and one or more TPMIs for M PUSCH repetitions, where M and N are integers, and M is greater than or equal to N. In some embodiments, the codebook based PUSCH indication can be predefined or configured by higher layer scheduling.

Figure 7:
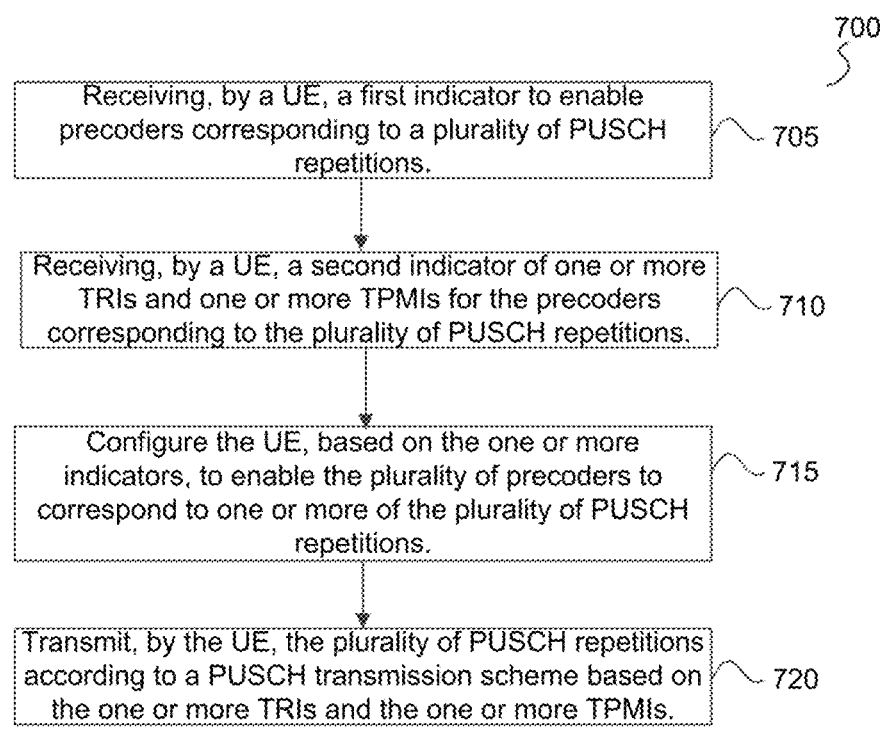
FIG. 7 illustrates an example method for a system (for example a user equipment (UE)) supporting configuration of a codebook-based repetitive PUSCH transmission scheme, according to some aspects of the disclosure.

As shown in FIG. 7, method 700 may represent the operation of an electronic device (for example UE 105 of FIG. 1) implementing mechanisms for configuring multiple repetition PUSCH transmissions. Method 700 may also be performed by system 200 of FIG. 2 and/or computer system 1000 of FIG. 10. But method 700 is not limited to the specific aspects depicted in those figures and other systems may be used to perform the method as will be understood by those skilled in the art. It is to be appreciated that not all operations may be needed, and the operations may not be performed in the same order as shown in FIG. 7.

At 705, a UE can receive from a base station, one or more indicators to enable a plurality of precoders corresponding to a plurality of PUSCH repetitions. For example, the UE can receive the configuration from a base station by a communications network. For example, at 705 a UE can receive from a base station, such as a gNB, an RRC that includes one or more parameter for PUSCH transmission. As described above, the UE can receive a multiPrecoderBasedCodebook parameter to indicate multiple precoders are enabled for a codebook-based PUSCH transmission scheme.

At 710, a UE can receive from a base station, one or more indicators specifying the plurality of precoders corresponding to a plurality of PUSCH repetitions. For example, the UE can receive the precoder configuration from a base station by a communications network. For example, a UE (for example, UE 105) can receive an indicator of one or more TRIs and one or more TPMIs corresponding to two or more PUSCH repetitions. In one non-limiting example, the UE 105 can receive, from the base station, one TRIs and two TPMIs corresponding to four or more PUSCH repetitions. Thereby, the UE is configured to map multiple precoders to multiple repetition PUSCH transmissions. As described above, processor 210 can implement different mechanisms for configuring multiple codebook-based PUSCH transmission repetitions in system 100 of FIG. 1.

According to one example, at 710 each precoder of a plurality of precoders can be indicated by a separate field of a DCI. Additionally or alternatively, one or more mapping schemes can be implemented by a TPMI/TRI configuration described above, with respect to FIGS. 4, and 5A to 5C. For example, the DCI, which can be one or more of DCIs 401, 501, 511, and 521) can include information in a jointly encoded 'Precoding information and number of layers' field that can include, for example, information about one or more TRI and N TPMIs. In another example, at 710 the indication of 'Precoding information and number of layers' can be provided by and configured according to higher layer signaling, for example, by RRC or media access control (MAC) control element (MAC CE). A base station can further configure each code-point to indicate one or more precoders. According to another example, where one TRI and more than one (N) TPMIs are provided, the TRI and one TPMI can be indicated by 'Precoding information and number of layers,' while the other TPMI(s) can be derived based on an offset predefined or configured by higher layer signaling or DCI.

According to some embodiments, as described above with respect to FIG. 5A to 5C, at 710 one or more TRI(s) and/or TPMIs can be indicated by a second stage DCI. According to one example, one or more TRIs can be indicated by base station 103 to UE 105 in a the first stage DCI, and one or more TPMIs can be indicated in a second stage DCI. In another example, one TRI/TPMI can be indicated by base station 103 to UE 105 by in a first stage DC and the other can be indicated by the second stage DCL. Further, the one or more TRI(s) and one or more TPMIs can be indicated to UE 105 by MAC CE from base station 103.

At 715, the LIE is configured, based on the indicator, to enable the plurality of precoders to correspond to one or more of the plurality of PUSCH repetitions. For example, the UE can be configured to map the precoders to the PUSCH repetitions by a cyclic or sequential mapping, as discussed above with respect to FIGS. 3 to 5. That is, in one example, the LIE 105 performs a cyclic mapping scheme (e.g., cyclic mapping scheme 310) to alternate precoders for each repetition of the PUSCH transmission. In this example, UE can map, based on the received TRIs and TPMIs, UE 105 is configured to map first and second precoders 315a and 315b in alternating manner to respective repetitions (e.g., first PUSCH repetition 310a, second PUSCH repetition 310b, third PUSCH repetition 310c, and fourth PUSCH repetition 310d) of the PUSCH transmission.

According to another example, the UE 105 performs a sequential mapping scheme (e.g., sequential mapping scheme 320) to sequentially associate precoders for each repetition of the PUSCH transmission. The UE 105 performs sequentially maps precoder 325a to first PUSCH repetition 320a and second PUSCH repetition 320b of the PUSCH transmission. The UE 105 can sequentially or cyclically map precoder 325b to correspond to third PUSCH repetition 320c, and fourth PUSCH repetition 320d of the PUSCH transmission.

In another example, where the same number of precoders and repetitions are provided, UE 105 can be configured to perform a one to one mapping of precoders to PUSCH repetitions. As above, UE 105 can be configured based on the various combinations of TRIs and two TPMIs to perform a mapping of a first precoder 405a and second precoder 405b with corresponding repetitions (e.g., first PUSCH repetition 406a, second PUSCH repetition 406b, third PUSCH repetition 406c, and fourth PUSCH repetition 406d) of the PUSCH transmission. In the above manner, UE 105 is enabled to transmit multiple repetition PUSCH beams. Configuring precoders to correspond to PUSCH repetitions enables PUSCH transmissions to be timely and reliably delivery in network communications but can increase resource and power demands on UE, for example. According to some aspects, configuring PUSCH transmissions permits a codebook based scheme to be implemented to coordinate operations and reduce undue resource demand.

At 720, the UE can use the configuration set forth above with respect to operation 715, including the PUSCH transmission scheme, to configure one or more PUSCH transmission repetitions. For example, in a UE of system 200, processor 210 can execute instructions to cause communication infrastructure 240 to transmit, via one or more transceivers 220a to 220n, a repetitive PUSCH transmission based on the configured transmission scheme. According to some aspects, processor 210 can implement processes for configuring PUSCH transmission that includes reliance on a timer, counter, or other means for enumerating PUSCH repetitions.

With an increase of PUSCH repetitions, even more PUSCH receptions opportunities for the base station (e.g., gNB) or communications network are provided. The UE can encounter challenges in managing power and resource consumption, especially when coordinating repetition beams with the base station. A network and UE can be configured to coordinate PUSCH transmission repetitions, i.e., precoders, between the UE and the serving gNB, to enable power saving. As discussed in detail below, coordinating PUSCH transmission repetitions and precoders between a BS and one or more UE(s) to can improve PUSCH transmission reliability and without placing undue demand on power and resource consumption.

Non-Codebook Signaling

According to some embodiments, a base station (e.g., a gNB) can indicate one or more (N) precoders corresponding to two or more PUSCH repetitions configured by a non-codebook based transmission scheme. For example, N indicated precoders and M PUSCH repetitions can be mapped based on a predefined pattern or configured pattern, as described above with respect to FIGS. 3 to 5.

Figure 8:
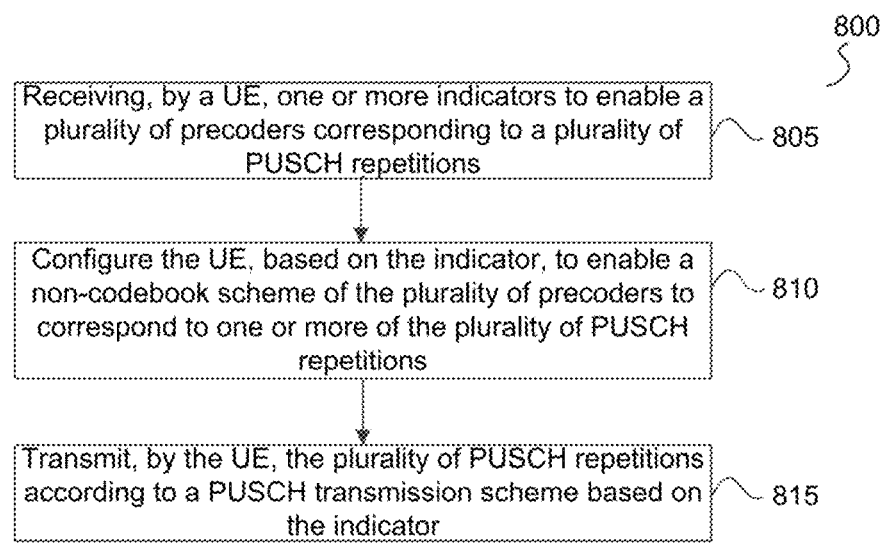
FIG. 8 illustrates an example method for a system (for example a user equipment (UE)) supporting configuration of a non-codebook based repetitive PUSCH transmission scheme, according to some aspects of the disclosure.
Figure 9:
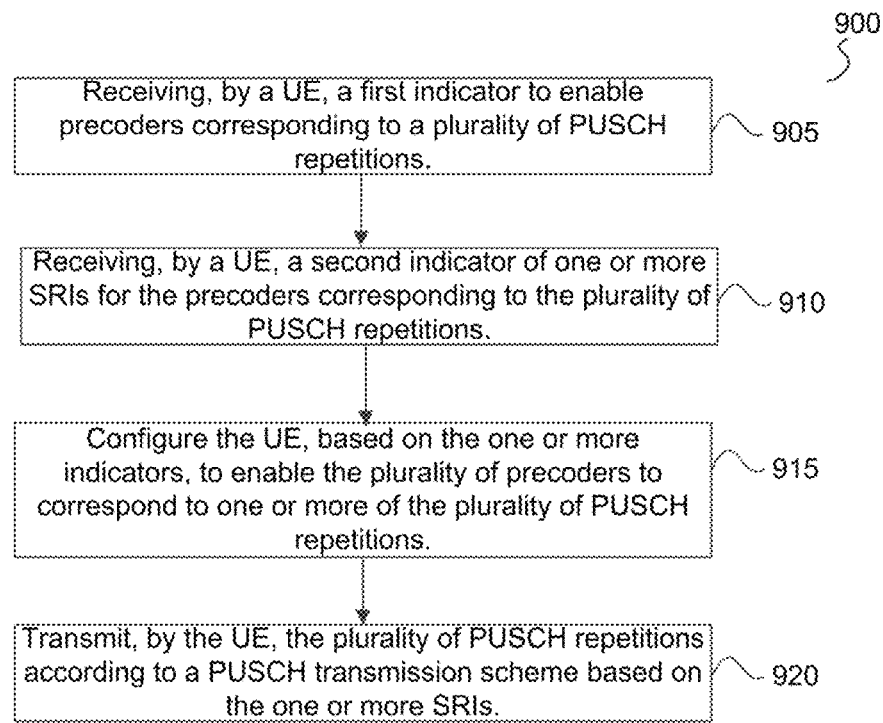
FIG. 9 illustrates an example method for a system (for example a user equipment (UE)) supporting configuration of a non-codebook based repetitive PUSCH transmission scheme, according to some aspects of the disclosure.

As discussed in more detail below with respect to FIGS. 8 and 9, processor 210 can implement different mechanisms for configuring multiple non-codebook based PUSCH transmission repetitions in system 100 of FIG. 1. FIG. 8 illustrates an example method 800 for a system (for example a user equipment (UE)) configuration of precoded PUSCH transmission repetitions, according to some aspects of the disclosure. As a convenience and not a limitation. FIGS. 8 and 9 may be described with regard to elements of FIGS. 1, and 2, and 10. As shown in FIG. 8, method 800 may represent the operation of an electronic device (for example, UE 105 of FIG. 1) implementing mechanisms for configuring multiple repetition PUSCH transmissions. Method 800 may also be performed by system 200 of FIG. 2 and/or computer system 1000 of FIG. 10. However, method 800 is not limited to the specific aspects depicted in those figures and other systems may be used to perform the method as will be understood by those skilled in the art. It is to be appreciated that not all operations may be needed, and the operations may not be performed in the same order as shown in FIG. 8.

At 805, a UE can receive from a base station, one or more indicators for a plurality of precoders corresponding to a plurality of PUSCH repetitions. For example, the UE can receive the configuration from a base station by a communications network. For example, a UE (for example, UE 105) can receive an indicator of one or more precoders corresponding to two or more PUSCH repetitions. In one non-limiting example, the UE 105 can receive, from the base station, two precoders corresponding to four or more PUSCH repetitions. The UE is configured to map multiple precoders to multiple repetition PUSCH transmissions. UE 105 is thereby enabled to transmit multiple repetition PUSCH beams. According to some aspects, configuring PUSCH transmissions permits a non-codebook based scheme to be implemented to coordinate operations and reduce undue resource demand.

In one example, at 805 a UE can receive from a base station, such as a gNB, an RRC that includes one or more parameter for PUSCH transmission. As described above, the UE can receive a multiPrecoderBasedNonCodebook parameter to indicate multiple precoders are enabled for a non-codebook based PUSCH transmission scheme. Additionally or alternatively, the UE can receive from the base station a further indication of multiple precoders for each repetition. That is, at 85, the UE can receive one or more indicators to enable multi-precoder PUSCH transmission and can receive one or more indicators specifying a plurality of precoders, for example, a quantity of precoders.

At 810, the UE is configured, based on the indicator, to enable the plurality of precoders to correspond to one or more of the plurality of PUSCH repetitions. For example, the UE can be configured to map the precoders to the PUSCH repetitions by a cyclic or sequential mapping, as discussed above with respect to FIGS. 3 to 5. That is, in one example, the UE 105 performs a cyclic mapping scheme (e.g., cyclic mapping scheme 310) to alternate precoders for each repetition of the PUSCH transmission. In this example, based on the indicator at 805, UE 105 is configured to map first and second precoders 315a and 315b in alternating manner to respective repetitions (e.g., first PUSCH repetition 310a, second PUSCH repetition 310b, third PUSCH repetition 310c, and fourth PUSCH repetition 310d) of the PUSCH transmission.

According to another example, the UE 105 performs a sequential mapping scheme (e.g., sequential mapping scheme 320) to sequentially associate precoders for each repetition of the PUSCH transmission. The UE 105 performs sequentially maps precoder 325a to first PUSCH repetition 320a and second PUSCH repetition 320b of the PUSCH transmission. The UE 105 sequentially maps precoder 325b to correspond to third PUSCH repetition 320c, and fourth PUSCH repetition 320d of the PUSCH transmission. In another example, where the same number of precoders and repetitions are provided. UE 105 can be configured to perform a one to one mapping of precoders to PUSCH repetitions.

At 815, the UE can use the configuration set forth above with respect to operation 810, including the PUSCH transmission scheme, to configure one or more PUSCH transmission repetitions. For example, in a UE of system 200, processor 210 can execute instructions to cause communication infrastructure 240 to transmit, via one or more transceivers 220a to 220n, a repetitive PUSCH transmission based on the configured transmission scheme. According to some aspects, processor 210 can implement processes for configuring PUSCH transmission that includes reliance on a timer, counter, or other means for enumerating PUSCH repetitions.

Non-Codebook Signaling by SRI(s)

As discussed in more detail below with respect to FIG. 9, processor 210 can implement different mechanisms for configuring multiple non-codebook based PUSCH transmission repetitions in system 100 of FIG. 1. FIG. 9 illustrates an example method 900 for a system (for example a user equipment (UE)) configuration of precoded PUSCH transmission repetitions, according to some aspects of the disclosure. For example, N indicated precoders and M PUSCH repetitions can be mapped based on a predefined pattern or configured pattern, as described above with respect to FIGS. 3 to 5. The precoders can be jointed coded and indicated by an SRS resource indicator. For example, a gNB can transmit signaling, such as DCI, to indicate N SRIs corresponding to M PUSCH repetitions. In some embodiments, the non-codebook based PUSCH indication can be predefined or configured by higher layer scheduling, such as RRC, or MAC CE.

At 905, a UE can receive from a base station, one or more indicators to enable a plurality of precoders corresponding to a plurality of PUSCH repetitions. For example, the UE can receive the configuration from a base station by a communications network. For example, at 905 a UE can receive from a base station, such as a gNB, an RRC that includes one or more parameter for PUSCH transmission. As described above, the UE can receive a multiPrecoderBasedNonCodebook parameter to indicate multiple precoders are enabled for a non-codebook based PUSCH transmission scheme.

At 910, a UE can receive from a base station, one or more indicators specifying the plurality of precoders corresponding to a plurality of PUSCH repetitions. For example, the UE can receive the configuration from a base station by a communications network. For example, a UE (for example, UE 105) can receive an indicator of one or more SRIs corresponding to two or more PUSCH repetitions. In one non-limiting example, the UE 105 can receive, from the base station, two SRIs corresponding to four or more PUSCH repetitions. The UE is configured to map multiple precoders to multiple repetition PUSCH transmissions. UE 105 is thereby enabled to transmit multiple repetition PUSCH beams. According to some aspects, configuring PUSCH transmissions permits a non-codebook based scheme to be implemented to coordinate operations and reduce undue resource demand.

At 915, the UE is configured, based on the indicator, to enable the plurality of precoders to correspond to one or more of the plurality of PUSCH repetitions. As above, in one example, where the same number of precoders and repetitions are provided, UE 105 can be configured to perform a one to one mapping of precoders to PUSCH repetitions.

According to other examples, the UE can be configured to map the precoders to the PUSCH repetitions by a cyclic or sequential mapping, as discussed above with respect to FIGS. 3 to 5. That is, in one example, the UE 105 performs a cyclic mapping scheme (e.g., cyclic mapping scheme 310) to alternate precoders for each repetition of the PUSCH transmission. In this example, UE can map, based on the received SRIs, UE 105 is configured to map first and second precoders 315*a* and 315*b* in alternating manner to respective repetitions (e.g., first PUSCH repetition 310*a*, second PUSCH repetition 310*b*, third PUSCH repetition 310*c*, and fourth PUSCH repetition 310*d*) of the PUSCH transmission.

According to another example, the UE 105 performs a sequential mapping scheme (e.g., sequential mapping scheme 320) to sequentially associate precoders for each repetition of the PUSCH transmission. The UE 105 performs sequentially maps precoder 325*a* to first PUSCH repetition 320*a* and second PUSCH repetition 320*b* of the PUSCH transmission. The UE 105 sequentially maps precoder 325*b* to correspond to third PUSCH repetition 320*c*, and fourth PUSCH repetition 320*d* of the PUSCH transmission.

As with the above description referring to FIGS. 4 and 5A to 5C, the N received SRIs can be provided by either a single stage DCI (similar to FIG. 4) or by a first stage and a second stage DCI (as in FIGS. 5A to 5C). According to one embodiment, the N SRIs are indicated by a second stage DCI. In other embodiments, one SRI can be indicated in a first stage DCI and the other (N−1) SRIs can be indicated in a second stage DCI. Alternatively, the N SRIs can be indicated by higher layer signaling, such as RRC or MAC CE. In some embodiments, UE 105 decodes both of a first stage DC and the second stage DCI to implement operation 915.

At 920, the UE can use the configuration set forth above with respect to operation 915, including the PUSCH transmission scheme, to configure one or more PUSCH transmission repetitions. For example, in a UE of system 200, processor 210 can execute instructions to cause communication infrastructure 240 to transmit, via one or more transceivers 220*a* to 220*n*, a repetitive PUSCH transmission based on the configured transmission scheme. According to some aspects, processor 210 can implement processes for configuring PUSCH transmission that includes reliance on a timer, counter, or other means for enumerating PUSCH repetitions.

Figure 10:
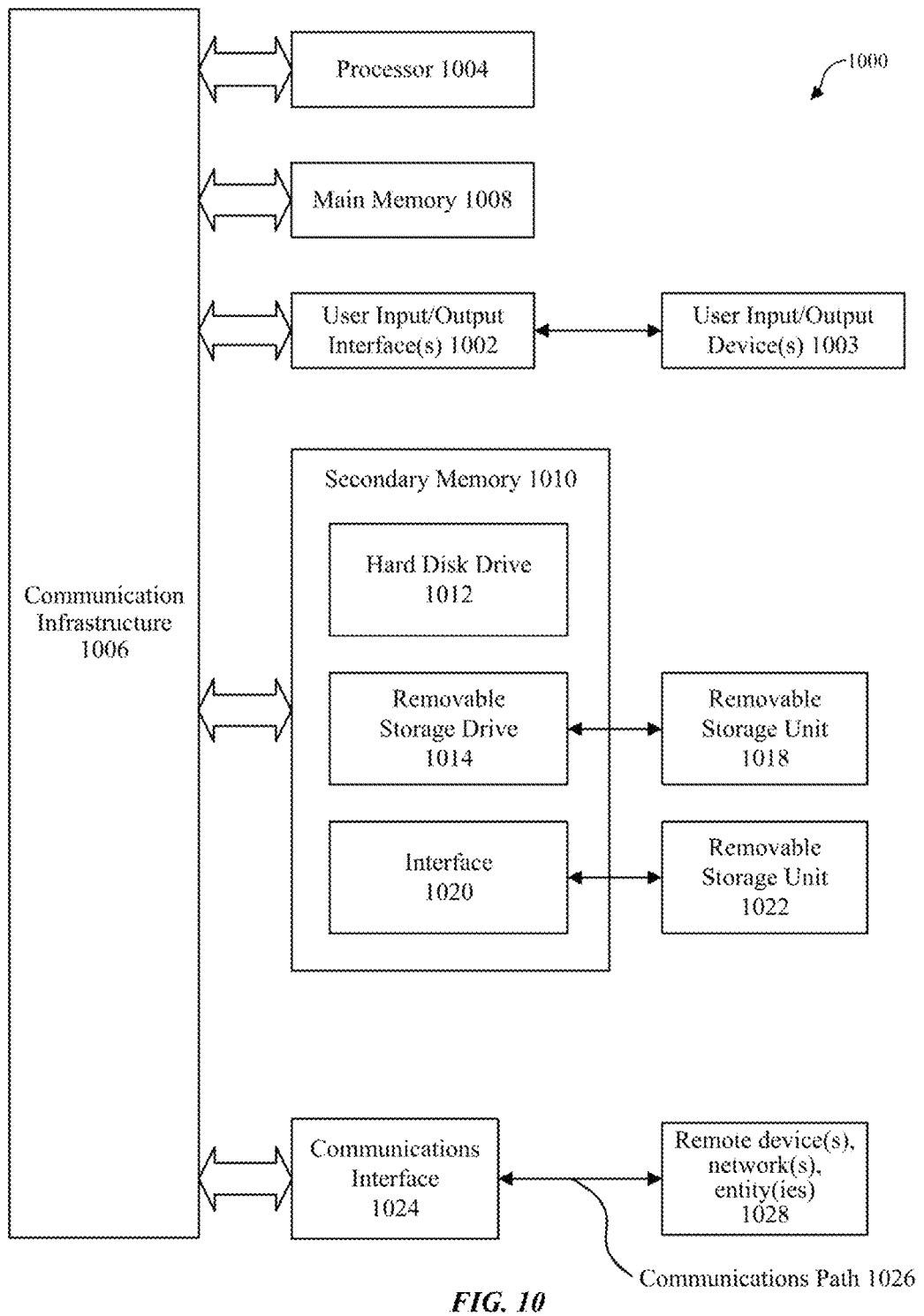
FIG. 10 is an example computer system for implementing some aspects or portion(s) thereof.

Various aspects can be implemented, for example, using one or more computer systems, such as computer system 1000 shown in FIG. 10. Computer system 1000 can be any well-known computer capable of performing the functions described herein such as devices 101 and 105 of FIG. 1, or 200 of FIG. 2. Computer system 1000 includes one or more processors (also called central processing units, or CPUs), such as a processor 1004. Processor 1004 is connected to a communication infrastructure 1006 (e.g., a bus.) Computer system 1000 also includes user input/output device(s) 1003, such as monitors, keyboards, pointing devices, etc., that communicate with communication infrastructure 1006 through user input/output interface(s) 1002. Computer system 1000 also includes a main or primary memory 1008, such as random access memory (RAM). Main memory 1008 may include one or more levels of cache. Main memory 1008 has stored therein control logic (e.g., computer software) and/or data.

Computer system 1000 may also include one or more secondary storage devices or memory 1010. Secondary memory 1010 may include, for example, a hard disk drive 1012 and/or a removable storage device or drive 1014. Removable storage drive 1014 may be a floppy disk drive, a magnetic tape drive, a compact disk drive, an optical storage device, tape backup device, and/or any other storage device/drive.

Removable storage drive 1014 may interact with a removable storage unit 1018. Removable storage unit 1018 includes a computer usable or readable storage device having stored thereon computer software (control logic) and/or data. Removable storage unit 1018 may be a floppy disk, magnetic tape, compact disk, DVD, optical storage disk, and/any other computer data storage device. Removable storage drive 1014 reads from and/or writes to removable storage unit 1018 in a well-known manner.

According to some aspects, secondary memory 1010 may include other means, instrumentalities or other approaches for allowing computer programs and/or other instructions and/or data to be accessed by computer system 1000. Such means, instrumentalities or other approaches may include, for example, a removable storage unit 1022 and an interface 1020. Examples of the removable storage unit 1022 and the interface 1020 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1000 may further include a communication or network interface 1024. Communication interface 1024 enables computer system 1000 to communicate and interact with any combination of remote devices, remote networks, remote entities, etc. (individually and collectively referenced by reference number 1028). For example, communication interface 1024 may allow computer system 1000 to communicate with remote devices 1028 over communications path 1026, which may be wired and/or wireless, and which may include any combination of LANs, WANs, the Internet, etc. Control logic and/or data may be transmitted to and from computer system 1000 via communication path 1026.

The operations in the preceding aspects can be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 1000, main memory 1008, secondary memory 1010 and removable storage units 1018 and 1022, as well as tangible articles of manufacture embodying any combination of the foregoing. Such control logic, when executed by one or more data processing devices (such as computer system 1000), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 10. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary aspects of the disclosure as contemplated by the inventor(s), and thus, are not intended to limit the disclosure or the appended claims in any way.

While the disclosure has been described herein with reference to exemplary aspects for exemplary fields and applications, it should be understood that the disclosure is not limited thereto. Other aspects and modifications thereto are possible, and are within the scope and spirit of the disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative aspects may perform functional blocks, steps, operations, methods, etc. using orderings different from those described herein.

References herein to "one aspect," "an aspect," "an example aspect." or similar phrases, indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it would be within the knowledge of persons skilled in the relevant art(s) to incorporate such feature, structure, or characteristic into other aspects whether or not explicitly mentioned or described herein.

The breadth and scope of the disclosure should not be limited by any of the above-described exemplary aspects, but should be defined only in accordance with the following claims and their equivalents.

What is claimed is:

1. A method, comprising:
receiving, by a user equipment (UE), an indicator from a base station, the indicator comprising information to enable a plurality of precoders;
configuring the UE, based on the indicator, to enable the UE to associate the plurality of precoders to one or more of a plurality of Physical Uplink Shared Channel (PUSCH) repetitions based on the indicator, the associating including a cyclic pattern between the plurality of precoders and the plurality of PUSCH repetitions; and
transmitting, by the UE, the one or more of the plurality of PUSCH repetitions corresponding to one or more of the plurality of precoders,
wherein the indicator comprises a first field and a second field in a single downlink control information (DCI) transmission, the first field in the single DCI transmission providing information about a first precoder, and the second field in the single DCI transmission providing information about a second precoder.

2. The method of claim 1, wherein the indicator is provided in higher layer signaling.

3. The method of claim 1, wherein the indicator is provided in a Radio Resource Control (RRC) communication, or provided in an information element (IE) corresponding to one or more of codebook-based transmission or non-codebook based PUSCH transmission.

4. The method of claim 1, wherein the indicator further comprises an indication of a PUSCH transmission scheme.

5. The method of claim 1, wherein:
the indicator is one of a multiPrecoderBasedCodebook information element (IE) or a multiPrecoderBasedNon-Codebook IE, and
either the UE enables multiple precoders for a codebook-based PUSCH transmission scheme based on the multiPrecoderBasedCodebook IE,
or the UE enables multiple precoders for a non-codebook based PUSCH transmission scheme based on the multiPrecoderBasedNonCodebook IE.

6. A method, comprising:
receiving, by a user equipment (UE), a first indicator from a base station, the first indicator comprising information to enable a plurality of precoders;
receiving, by the user equipment (UE), a second indicator from the base station, the second indicator comprising information about the plurality of precoders, wherein the plurality of precoders correspond to M Physical Uplink Shared Channel (PUSCH) repetitions, wherein M is an integer;

configuring, by the UE, the plurality of precoders based on the first indicator and the second indicator, wherein the plurality of precoders correspond with the M PUSCH repetitions using a cyclic pattern of correspondence; and transmitting, by the UE, one or more of the M PUSCH repetitions corresponding to one or more of the plurality of precoders, wherein the first indicator and the second indicator respectively comprise a first field and a second field in a single downlink control information (DCI) transmission.

7. The method of claim 6, wherein the second indicator identifies a quantity of precoders enabled for PUSCH repetitions.

8. The method of claim 6, wherein at least one of the first indicator or the second indicator is provided in higher layer signaling.

9. The method of claim 6, wherein the second indicator provides an indication of the plurality of precoders corresponding to two or more of the M PUSCH repetitions.

10. The method of claim 6, wherein the second indicator is provided for the M PUSCH repetitions, in a scheduling downlink control indicator (DCI) communication.

11. The method of claim 10, wherein the second indicator is provided within N sounding reference signal (SRS) resource indicator(s) (SRIs) of the scheduling DCI, wherein N is an integer less than or equal to M, wherein the N SRIs are selected from one or more SRS resource sets for non-codebook based transmission, and wherein a mapping of the N SRIs and M PUSCH repetitions is based on a configured pattern.

12. The method of claim 6, wherein the UE, based on the second indicator, generates a mapping of the plurality of precoders to the M PUSCH repetitions.

13. The method of claim 6, wherein the second indicator comprises one or more transmission rank indicator (TRIs) and N transmission precoder matrix indicators (TPMIs) for the M PUSCH repetitions, and wherein N is an integer less than or equal to M.

14. A user equipment (UE), comprising:
a transceiver to communicate with a base station; and
a processor coupled to a memory, wherein the processor is configured to execute instructions stored in the memory to:
receive, from the base station via the transceiver, a first indicator comprising information to enable a plurality of precoders;
receive, from the base station via the transceiver, a second indicator comprising information about the plurality of precoders corresponding to M Physical Uplink Shared Channel (PUSCH) repetitions, wherein M is an integer;
configure, based on the first indicator and the second indicator, the plurality of precoders, wherein the plurality of precoders correspond with the M PUSCH repetitions using a cyclic pattern of correspondence; and
transmit one or more of the M PUSCH repetitions corresponding to one or more of the plurality of precoders,
wherein the first indicator and the second indicator respectively comprise a first field and a second field in a single downlink control information (DCI) transmission.

15. The UE of claim 14, wherein at least one of the first indicator and the second indicator is provided in higher layer signaling.

16. The UE of claim 14, wherein the second indicator provides an indication of a plurality of precoders corresponding to two or more of the M PUSCH repetitions.

17. The UE of claim 14, wherein the second indicator comprises an indication of one or more transmission rank indicator (TRIs) and N transmission precoder matrix indicators (TPMIs) for the M PUSCH repetitions, and wherein N is an integer less than or equal to M.

18. The UE of claim 17, wherein the second indicator provides an indication of one TRI and N TPMIs for M PUSCH repetitions.

19. The UE of claim 14, wherein the second indicator is provided for the M PUSCH repetitions, in a scheduling downlink control indicator (DCI) communication.

20. The UE of claim 19, wherein the second indicator is provided within N sounding reference signal (SRS) resource indicator(s) (SRIs) of the scheduling DCI, wherein N is an integer less than or equal to M, wherein the N SRIs are selected from one or more SRS resource sets for non-codebook based transmission, and wherein the N SRIs and M PUSCH repetitions are mapped based on a configured pattern.

* * * * *